(12) United States Patent  (10) Patent No.: US 8,649,609 B1
Morfopoulos et al.  (45) Date of Patent: Feb. 11, 2014

(54) FIELD PROGRAMMABLE GATE ARRAY APPARATUS, METHOD, AND COMPUTER PROGRAM

(75) Inventors: Arin C Morfopoulos, Altadena, CA (US); Thang D Pham, Arcadia, CA (US)

(73) Assignee: The United States of America as Represented by the Adminstrator of the National Aeronautics and Space Administration, Washington, DC (US)

( * ) Notice: Subject to any disclaimer, the term of this patent is extended or adjusted under 35 U.S.C. 154(b) by 390 days.

(21) Appl. No.: 13/071,299

(22) Filed: Mar. 24, 2011

(51) Int. Cl.
G06K 9/68 (2006.01)
G06K 9/62 (2006.01)
G06K 9/64 (2006.01)
G06F 17/50 (2006.01)

(52) U.S. Cl.
USPC ........... 382/218; 382/215; 382/217; 716/116; 716/117; 716/121

(58) Field of Classification Search
None
See application file for complete search history.

(56) References Cited

U.S. PATENT DOCUMENTS

| | | | |
|---|---|---|---|
| 6,118,724 A | 9/2000 | Higginbottom | |
| 6,822,976 B1 | 11/2004 | Riesenman et al. | |
| 6,941,438 B2 | 9/2005 | Wolrich et al. | |
| 7,047,374 B2 | 5/2006 | Sah et al. | |
| 7,174,432 B2 | 2/2007 | Howard et al. | |
| 7,353,320 B2 | 4/2008 | Jeddeloh | |
| 7,415,331 B2 | 8/2008 | Dapp et al. | |
| 7,418,571 B2 | 8/2008 | Wolrich et al. | |
| 7,464,225 B2 | 12/2008 | Tsern | |
| 7,707,366 B2 | 4/2010 | Tagawa | |
| 7,761,687 B2 | 7/2010 | Blumrich et al. | |
| 7,805,577 B1 | 9/2010 | Mattina et al. | |
| 7,818,519 B2 | 10/2010 | Plunkett | |
| 2007/0255480 A1* | 11/2007 | Southall et al. | 701/96 |
| 2010/0104199 A1* | 4/2010 | Zhang et al. | 382/199 |

OTHER PUBLICATIONS

"Alpha Data ADM-XRC-4 Data Sheet", Apr. 2, 2009, http://www.alpha-data.com/pdfs/adm-xrc-4.pdf.
T. Vancourt and M.C. Herbordt, "Application-Specific Memory Interleaving for FPGA-Based Grid Computations", 2006, www.bu.edu/caadlab/FCCM06POSTER_mem.ppl, Boston, USA.

* cited by examiner

*Primary Examiner* — Vu Le
*Assistant Examiner* — Kenny Cese
(74) *Attorney, Agent, or Firm* — Mark Homer

(57) ABSTRACT

An apparatus is provided that includes a plurality of modules, a plurality of memory banks, and a multiplexor. Each module includes at least one agent that interfaces between a module and a memory bank. Each memory bank includes an arbiter that interfaces between the at least one agent of each module and the memory bank. The multiplexor is configured to assign data paths between the at least one agent of each module and a corresponding arbiter of each memory bank based on the assigned data path. The at least one agent of each module is configured to read data from the corresponding arbiter of the memory bank or write modified data to the corresponding arbiter of the memory bank.

7 Claims, 8 Drawing Sheets

100

600

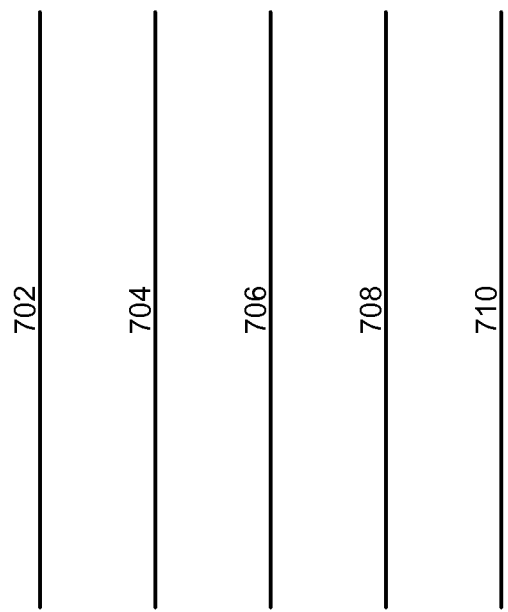

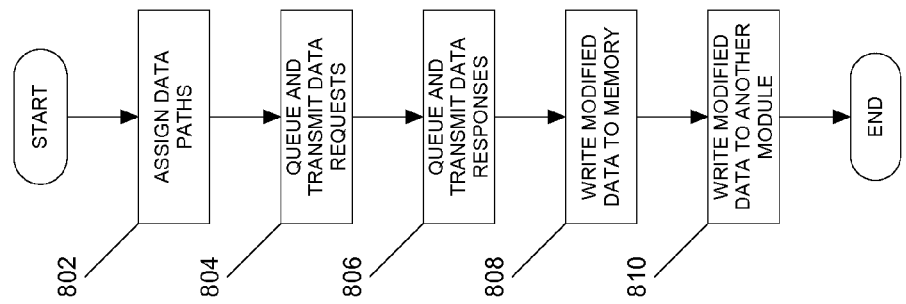

FIELD PROGRAMMABLE GATE ARRAY APPARATUS, METHOD, AND COMPUTER PROGRAM

STATEMENT OF GOVERNMENT INTEREST

Embodiments of the present invention described herein were made in the performance of work under NASA contract and are subject to the provisions of Public Law #96-517 (35 U.S.C. §202) in which the Contractor has elected not to retain title.

FIELD

The present invention relates to a Field Programmable Gate Array (FPGA) apparatus, method, and computer program and, more particularly, to an FPGA architecture that allows the exchange of data directly between modules without reducing throughput of memory access.

BACKGROUND

There are different types of buses that handle the interfaces between modules in an FPGA architecture, and different types of buses that allow data to flow from an FPGA to memory. For instance, industry standard buses provide a series of cores (i.e., pre-built FPGA modules). However, the pre-built FGPA modules lack a high volume point-to-point bus. For example, the buses are not designed to transmit data from module to module without reducing throughput of memory access. Further, the complexity of the buses slows the processing of data, which results in a slower throughput.

SUMMARY

Certain embodiments of the present invention may provide solutions to the problems and needs in the art that have not yet been fully identified, appreciated, or solved by current FPGA technology.

In accordance with an embodiment of the present invention, an apparatus is provided and includes a plurality of modules, a plurality of memory banks, and a multiplexor. Each module includes at least one agent that interfaces between a module and a memory bank. Each memory bank includes an arbiter that interfaces between the at least one agent of each module and the memory bank. The multiplexor is configured to assign data paths between the at least one agent of each module and a corresponding arbiter of each memory bank based on the assigned data path. The at least one agent of each module is configured to read data from the corresponding arbiter of the memory hank or write modified data to the corresponding arbiter of the memory bank.

In accordance with another embodiment of the present invention, a method is provided that includes assigning, by a multiplexor, data paths between at least one agent of a module and a corresponding arbiter of a memory bank. The method also includes reading, by the at least one agent of the module, data from the corresponding arbiter of the memory bank based on the assigned data path, and writing, by the at least one agent of the module, modified data to the corresponding arbiter of the memory bank based on the assigned data path In accordance with another embodiment of the present invention, a computer-implemented method is provided. The method includes receiving, at a rectification module, image data from memory and rectifying the image data. The method includes receiving, at a filter module, the rectified image data and filtering unwanted data from the rectified image data to generate filtered image data. The method further includes receiving, at a disparity module, the filtered image data and generating a result in order to determine a distance between an object and a vehicle. The method also includes transmitting, by an agent associated with the disparity module, the result to the memory.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 7 illustrates a read agent pass-through unit, in accordance with an embodiment of the present invention; and FIG. 8 illustrates a method for receiving and transmitting data from a module utilizing agents, in accordance with an embodiment of the present invention.

DETAILED DESCRIPTION OF THE EMBODIMENTS

It will be readily understood that the components of the present invention, as generally described and illustrated in the figures herein, may be arranged and designed in a wide variety of different configurations. Thus, the following detailed description of the embodiments of an apparatus, a system, and a method, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Embodiments of the present invention provide an apparatus, method and computer program configured to transmit data from module to module or from a module to memory (i.e., point-to-point data transfer). The embodiments also provide a continuous throughput of a high data volume, and allow for different types of memory and the switching of memory without affecting the modules during runtime.

Some embodiments of the present invention may be utilized to take images for extraterrestrial navigation of a robot or vehicle, such as lunar rover or Mars rover navigation. At least two images of the area in front of the lunar rover are captured, and the images are processed to determine where the objects are in order for the rover to navigate around the objects. Embodiments of the present invention utilize an apparatus that includes at least a rectification module, a filter module, and a disparity module in order to process the captured image.

Further, the embodiments described herein enable data to flow directly from module to module without accessing the memory interface. More importantly, the interfaces of the modules are maintained so that none of the modules behave differently if they interface with each other or directly with the memory. In other words, the modules are unaffected when the data path changes.

Figure 1:
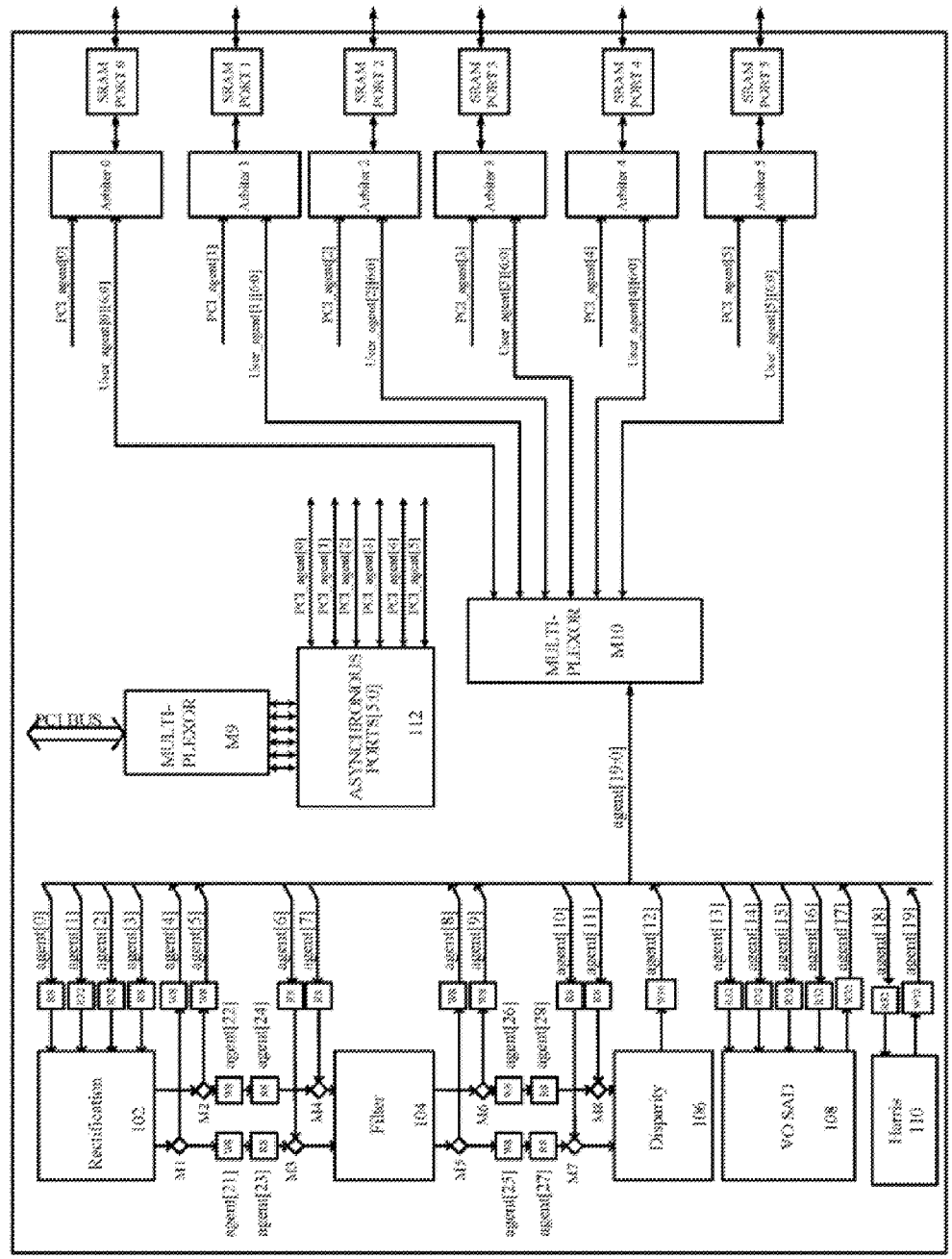
FIG. 1 illustrates an FPGA vision data apparatus, in accordance with an embodiment of the present invention.

FIG. 1 illustrates an FPGA vision data apparatus 100, in accordance with an embodiment of the present invention. Vision data apparatus 100 includes a plurality of modules—rectification module 102, filter module 104, disparity module 106, Visual Odometry Sum of Absolute Differences (VO SAD) module 108, Harris module 110, and Asynchronous Ports 112. Vision data apparatus 100 also includes multiplexors M1, M2, M3, M4, M5, M6, M7, M8, M9, and M10. Multiplexor M9 is a Peripheral Component interconnect (PCI) to bank mapping multiplexor and multiplexor M10 is a vision agent to bank mapping multiplexor. Apparatus 100 also includes arbiter 0, arbiter 1, arbiter 2, arbiter 3, arbiter 4 and arbiter 5, as well as SRAM Port 0, SRAM Port 1, SRAM Port 2, SRAM Port 3, SRAM Port 4 and SRAM Port 5. The SRAM Ports allow memory banks and arbiters to exchange data.

It should be appreciated that arbiters 0, 1, 2, 3, 4, 5 may be round robin arbiters interfaced with PCI_agent [0], PCI_agent [1], PCI_agent [2], PCI_agent [3], PCI_agent [4], and PCI_agent [5], respectively. When, for example, rectification module 102 submits a request to arbiter 0, arbiter 0 is configured to handle requests from both rectification module 102 and PCI_agent [0]. However, if rectification module 102 is utilizing agents [0] and [1] to submit a request to arbiter 0 and a PCI_agent [0] makes a request to arbiter 0, then PCI_agent [0] has priority to make the request over the two agents. In other words, PCI agents have priority over any agent utilized by the modules when making requests.

Asynchronous polls 112 are utilized in this embodiment because the clock domain of a PCI bus generally operates at 66 MHz, while the clock domains of memory generally operate between 66 MHz to 333 MHz, depending on the chip. In other words, asynchronous ports 112 assist in communicating between a PCI bus and memory. It should also be appreciated that each agent has an asynchronous bus because modules usually cannot operate at 333 MHz since modules generally operate at a maximum speed of 100 MHz. In other words, the asynchronous bus in each agent assists in communicating between the module and memory.

In this embodiment, read agent [0], read agent [3], write agent [4], write agent [5], read agent [6], read agent [7], write agent [8], write agent [9], read agent [10], read agent [11], write agent [21], write agent [22], read agent [23], read agent [24], write agent [25], write agent [26], read agent [27], and read agent [28] have a width of 8 bits. Write agent [12] has a width of 16 bits, while read agent [1], read agent [2], read agent [13], read agent [14], read agent [15], read agent [16], write agent [17], read agent [18], and write agent [19] have a width of 32 bits. A person of ordinary skill in the art will readily appreciate that the read agents and write agents can be configured to have any width, i.e., 16 bits, 32 bits, etc. It should also be appreciated that the read agents or write agents can be a single read/write agent. Also, it should be appreciated that each module can be operatively connected to any number of read and/or write agents.

Rectification module 102 is configured to read image data and de-warp (or rectify) the image taken by a camera. It should be noted that in order to control rectification module 102, rectification module 102 is operatively connected to a sideband bus, such as PCI bus, advanced microcontroller bus architecture (AMBA), On-Chip Peripheral Bus (OPB), a wishbone bus, or any bus that would be appreciated by a person of ordinary skill in the art. It should also be appreciated that other modules described herein are configured in a similar manner.

In order for rectification module 102 to read data from memory, rectification module 102 interfaces with or is operatively connected to sequential read agent [0], sequential read agent [1], sequential read agent [2], and sequential read agent [3]. This connection allows rectification module 102 to request and read image data and rectification table data from the read agents. The rectification module then compares the image data with the rectification table data and generates de-warped (or rectified) image data that can be outputted to memory or filter module 104. In order for rectification module 102 to write data to memory or to filter module 104, rectification module 102 also interfaces with or is operatively connected to sequential write agent [4], sequential write agent [5], pass-through write agent [21] and pass-through write agent [22] via multiplexor M1 and multiplexor M2. Write agent [21] and write agent [22] are operatively connected to pass-through read agent [23] and pass-through read agent [24], respectively.

Filter module 104 is configured to receive rectified image data from rectification module 102 and remove any unnecessary data from the image data. In order for filter module 104 to receive the rectified image data from memory or rectification module 102, filter module 104 is operatively connected to sequential read agent [6], sequential read agent [7], pass-through read agent [23], and pass-through read agent [24] via multiplexors M3 and M4. Once the rectified image data is received, filter module 104 removes any unnecessary data from the image. In order for filter module 104 to write data to memory or disparity module 106, filter module 104 is operatively connected to sequential write agent [8], sequential write agent [9], pass-through write agent [25], and pass-through write agent [26] via multiplexors M5 and M6. Write agent [25] and write agent [26] are operatively connected to pass-through read agent [27] and pass-through read agent [28], respectively.

Disparity module 106 is configured to receive filtered image data and output a score in order to assist in determining the distance between a rover and an object in front of the rover. In order for disparity module 106 to read data (i.e., filtered image data) from memory or filter module 104, disparity module 106 is operatively connected to sequential read agent [10], sequential read agent [11], pass-through read agent [27], and pass-through read agent [28] via multiplexor M7 and M8. In order for disparity module 106 to write data to memory, disparity module 106 is operatively connected to sequential write agent [12].

Harris module 110 is configured to receive image data from the memory and determine features in the image data. In order for Harris module 110 to read data from memory, Harris module 110 is operatively connected to sequential read agent [18]. In order to write data to memory, Harris module 110 is operatively connected to sequential write agent [19].

VO SAD module 108 is configured to receive a plurality of images and features of the plurality of images to determine how far the rover has traveled. In order for VO SAD module 108 to read such data from the memory, VO SAD module 108 is operatively connected to sequential read agent [13], sequential read agent [14], sequential read agent [15], and sequential read agent [16]. In order to write data (i.e., the result of the determination) to the memory, VO SAD module 108 is operatively connected to sequential write agent [17].

In view of the apparatus shown in FIG. 1, the following is a detailed description of computer vision or image processing during rover navigation. To perform computer vision or image processing, vision modules such as rectification module 102, filter module 104, and disparity module 106 are utilized. Rectification module 102 is configured to remove any lens artifact in a captured image, i.e., warped pixels in the image are removed and a rectified image is generated.

In this embodiment, for every captured image, there is a left image and a right image and, for each image, there is a left image rectification table and a right image rectification table. The rectification table includes a de-warping map to identify each pixel location. Rectification module 102 transmits a request to read agent [0] and read agent [1], and receives a right pixel from read agent [0] and a right rectification table entry (stored in the right image rectification table) from read agent [1]. The rectification entry includes information on how the input pixel should be adjusted or weighted before being written to the output. Rectification module 102 also transmits a request to read agent [2] and read agent [3], and receives a left pixel from read agent [2] and a left rectification table entry (stored in the left image rectification table) from read agent [3]. It should be noted that rectification module 102 continuously reads in each left pixel from the captured image and calculates upon each left pixel using a corresponding left rectification table entry stored in the rectification table until all of the pixels are read from the memory. Based on the comparison, rectification module 102 outputs a corrected (or rectified) pixel for each left pixel to filter module 104 or memory. A similar process is conducted simultaneously for the right pixel of the captured image.

Filter module 104 includes two inputs to continuously receive right rectified pixels and left rectified pixels from read agent [6] and read agent [7], respectively. Filter module 104 can also receive right rectified pixels and left rectified pixels from read agent [23] and read agent [24], respectively. As right rectified pixels and left rectified pixels are being read by filter module 104, filter module 104 continuously removes any bias (i.e., DC Bias or Constant Bias across the image) or unnecessary data from the captured image. For instance, filter module 104 removes or filters unnecessary data included in the right rectified pixels and the left rectified pixels. Depending on the application command, filter module 104 is configured to output the filtered right pixels to write agent [8] and/or write agent [25] and output the filtered left pixels to write agent [9] and/or write agent [26].

Disparity module 106 includes two input ports that continuously receive the filtered right pixels and the filtered left pixels from read agent [10] and read agent [11] until all the filtered pixels are received. Disparity module 106 can also receive the filtered right pixels and the filtered left pixels from read agent [27] and read agent [28], respectively. Disparity module 106 compares the filtered left pixels with the filtered right pixels and outputs a result. The result includes distance information between, for example, the rover and an object in front of the rover. The result is written to write agent [12] in order for the result to be transmitted to memory via multiplexor M10 and a pre-selected arbiter.

By allowing data to be transferred between rectification module 102, filter module 104, and disparity module 106, navigation information regarding an image captured by a rover's camera is obtained in a quick and efficient manner.

Once the objects in front of the rover are identified, VO SAD module 108 and Harris module 110 are utilized to determine how far the rover has moved. It should be appreciated that this application is not only limited to a rover, but any other vehicle, robot or other machine that may be appreciated by a person of ordinary skill in the art. In order to determine how far the rover has moved, Harris module 110 is utilized to detect features in two or more images and VO SAD module 108 is utilized to compare the features detected in two or more images and determine the distance traveled.

In this embodiment, Harris module 110 transmits a request to read agent [18] and receives image data from read agent [18]. Harris module 110 detects features in the image and stores the location of the features in the image, as well as the score of the features. Harris module 110 transmits the location of the features and the score of the features to write agent [19]. As the rover continues to move, Harris module 110 receives new image data and transmits the location of the features in the new image and the score of the features.

VO SAD module 108 is then configured to receive a current image (i.e., set image), an old image (i.e., reference image), a list of the features for the set image, and a list of the features for the reference image from memory via read agent [13], read agent [14], read agent [15] and read agent [16]. VO SAD module 108 compares the list of the features from the set image and the reference image, and outputs a score for every possible pairing for the set and reference features of the image to write agent [17]. The score allows the rover to determine how far the rover has moved on an extraterrestrial surface.

It should be appreciated that the modules shown in FIG. 1 each comprise an agent that interfaces with a memory bank for both read and write operations. As described above, each agent can either be a read or write agent, and have a width of 8 bits, 16 bits, 32 bits, etc. FIG. 1 also illustrates that each memory bank has a single arbiter that handles all memory requests to its bank. The memory can be double data rate (DDR) RAM, DDR synchronous static random access memory (SSRAM), DDR2, NAND memory, or any other suitable storage device.

In order for the agents to interact with an arbiter, a vision agent to bank mapping multiplexor is utilized to assign the agents to the appropriate arbiters of the memory banks. In order to allow bursting of data for high throughput, it should also be appreciated that each agent can queue multiple memory requests and queue multiple memory responses. Also, with the multiplexors selecting the data path, each data path is point-to-point to result in a high throughput.

Figure 2:
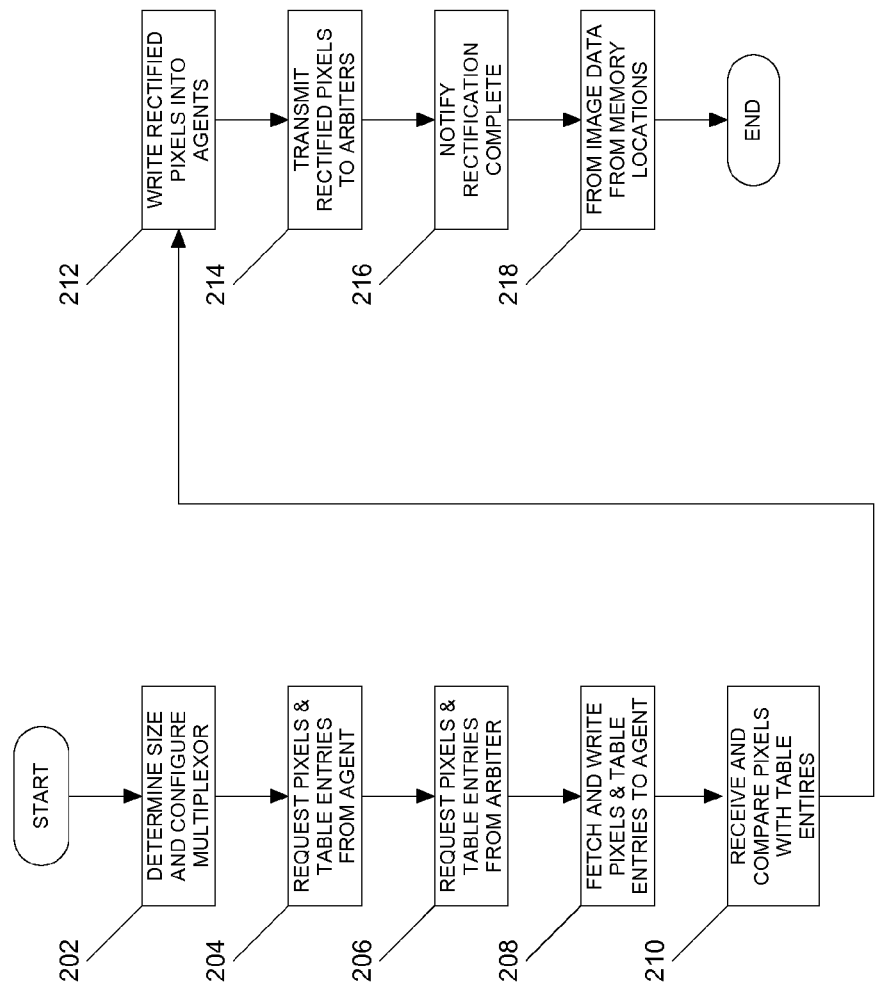
FIG. 2 illustrates a method for rectifying a captured image, in accordance with an embodiment of the present invention.

FIG. 2 illustrates a method 200 for rectifying a captured image, in accordance with an embodiment of the present invention. In particular, the following describes the process of rectifying an image by utilizing the apparatus shown in FIG. 1.

In order to utilize rectification module 102, an FPGA module (not shown), a computer program, and/or a processor is configured to determine at 202 the size of the image and configure the multiplexers (i.e., M1, M2, and M10) to rectification only. It should be appreciated that by configuring multiplexor M10 to rectification only, agent [0] to agent [5] are operatively connected to arbiter 0 to arbiter 5.

At 204, rectification module 102 requests a right pixel from agent [0], a right rectification table entry from agent [1], a left pixel from agent [2], and a left rectification table entry from agent [3]. In response to the request, each agent at 206 submits a request to the corresponding arbiter for the respective pixel and entry. The arbiter at 208 fetches the respective pixels and entries, and writes the respective pixels and entries into the read agents in order for rectification module 102 to read the requested pixels and entries. This process continues until all left and right pixels of the image, as well as the left and right rectification table entries are received by rectification module 102.

At 210, as rectification module 102 receives right and left pixels, rectification module 102 compares the right pixel with the right rectification table entry and rectifies the right pixel accordingly. A similar process is carried out for the left pixel. At 212, as the right pixels and left pixels are being rectified, the rectified right pixels are being written into agent [4] and the rectified left pixels are being written into agent [5] via multiplexer M1 and M2, respectively.

Agent [4] and agent [5] transmit at 214 each of the rectified right pixels and each of the rectified left pixels to arbiter 4 and arbiter 5 so arbiter 4 and arbiter 5 can write the rectified pixels into the correct memory location. This process is carried out until all of the pixels in the image are rectified. Once all of the rectified pixels are written into memory, rectification module 102 raises a flag at 216 to notify the processor that the image is rectified. When rectification module 102 is finished, the processor can read the rectified image data at 218 from arbiter 4 and arbiter 5 by utilizing the PCI agents.

Figure 3:
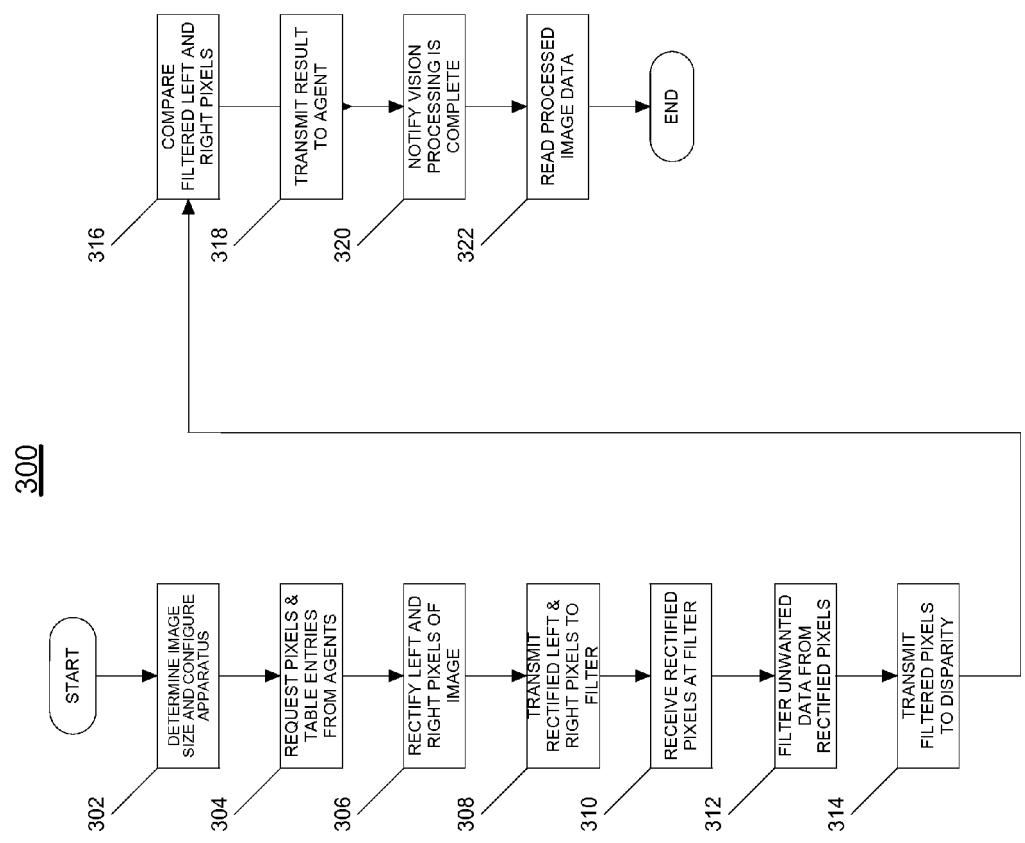
FIG. 3 illustrates a method for image processing during rover navigation, in accordance with an embodiment of the present invention.

FIG. 3 illustrates a method 300 for image processing during rover navigation, in accordance with an embodiment of the present invention. In particular, the PCI Bus, which can be controlled by a processor, can set at 302 the image size and configure rectification module 102, filter module 104 and disparity module 106 to connect to one another, and configure multiplexor M10 to connect agents [0]-[3] to arbiters 0-3 and connect agent [9] and agent [12] to arbiters 4 and 5. Multiplexors M1-M8 are also configured to pass data to corresponding agents.

At 304, rectification module 102 continuously requests right pixels of an image, right rectification table entries, left pixels of an image, and left rectification table entries from agents [0]-[3] until all right and left pixels have be received. At 306, for every right pixel and right rectification pixel received and for every left pixel and left rectification table entry received, rectification module 102 is configured to rectify each right and left pixel. As the right pixels and left pixels are being rectified, rectified right pixels and rectified left pixels are continuously transmitted at 308 to filter module 104 via pass-through agents [21]-[24].

At 310, filter module 104 continuously receives rectified right pixels and rectified left pixels of the image. While receiving each pixel, filter module 104 processes the rectified right pixels and the rectified left pixels at 312 and removes unwanted data from the rectified right pixels and the rectified left pixels.

Filtered right pixels are transmitted at 314 to disparity module 106 via pass-through agents [25] and [27], and filtered left pixels are transmitted to disparity module 106 via pass-through agents [26] and [28]. Filtered left pixels are also transmitted to arbiter 4 by writing the left pixel data to write agent [9]. Disparity module 106 compares at 316 the filtered left pixels with the filtered right pixels and outputs a result. The result can include distance information between, for example, the rover and an object in front of the rover. The result is transmitted at 318 to agent [12] so the outputted information can be stored in memory via arbiter 5.

When rectification module 102, filter module 104, and disparity module 106 finish reading and processing the data, disparity module 106 is configured to flag the PCI bus at 320 in order to notify the processor that the process of reading and processing the image is complete. The processor is then configured to read at 322 the processed left image and processed right image from the memory. It should be appreciated that the process of reading, processing, and transferring data between the modules increases the speed of analyzing the image.

Figure 4:
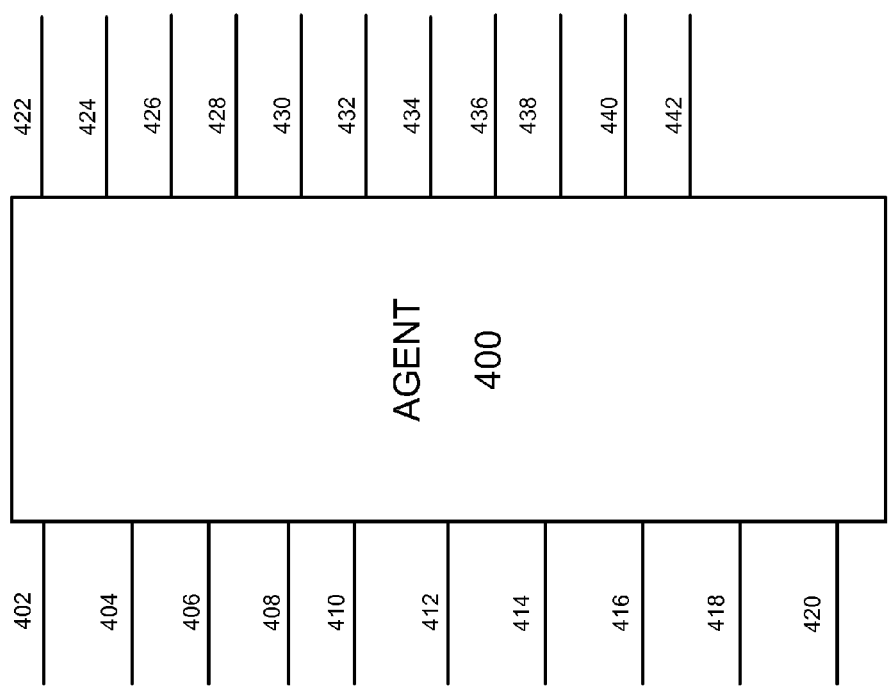
FIG. 4 illustrates a read agent sequential unit, in accordance with an embodiment of the present invention.

FIG. 4 illustrates a read agent sequential unit 400, in accordance with an embodiment of the present invention. Read agent sequential unit 400 can interface with a rectification module, a filter module, a disparity module, a VO SAD module, a Harris module, or any module that can be appreciated by a person of ordinary skill in the art. For instance, the following signals path can interface with a module: FIFO data 402, FIFO read enabled 404, FIFO empty 406, FIFO almost empty 408, FIFO valid 410, memory size 412, memory address 414, memory go 416, memory address full 418, and memory address almost full 420.

In this embodiment, FIFO data 402 has a width of 8 bits, but can have a width of 16 bits, 32 bits, or any width that can be appreciated by a person of ordinary skill in the art. It should be appreciated that the width is module-specific. For example, FIG. 1 illustrates that rectification module interfaces with two read agent sequential units, which include a width of 8 bits, and two read agent sequential units, which include a width of 32 bits. The disparity module and filter module, however, can interface with two read agent sequential units, which include a width of 8 bits.

FIFO read enabled 404 has a width of 1 bit, FIFO empty 406 has a width of 1 bit, FIFO almost empty 408 has a width of 1 bit, and FIFO valid 410 has a width of 1 bit. Memory size 412 has a width of 24 bits, memory address 414 has a width of 24 bits, memory go 416 has a width of 1 bit, memory address full 418 has a width of 1 bit, and memory address almost full 420 has a width of 1 bit.

This embodiment allows read agent sequential unit 400 to receive a request from, for example, rectification module 102 and convert the request into a request that the arbiter can utilize. For instance, read agent sequential unit 400 receives a starting address of the data via memory address 414 and a size of the data to be read via memory size 412, and is triggered by a memory go flag 416. In other words, rectification module 102, for example, transmits a request to read agent sequential 400 with the size of the data and the starting address of the data, and instructs read agent sequential unit 400 to go fetch the data. Read agent sequential unit 400 then requests the arbiter for all of the data, starting at the starting address for as many bytes as are required. This configuration reduces the complexity of the module by interfacing read agent sequential unit 400 with the arbiter.

When read agent sequential unit 400 receives the data from the arbiter, the data is placed in a FIFO (first-in-first-out queue) so rectification module 102 can read the data via FIFO data 402. As the data is stored in the FIFO, FIFO empty 406 is converted to false in order for rectification module 102 to read the data in the FIFO. At this point, FIFO read enabled 404 will be set to true in order for rectification module 102 to read data.

As mentioned above, in order for data to be requested from memory, read agent sequential unit 400 also interfaces with an arbiter. The following signal paths allow read agent sequential unit 400 to interface with the arbiter: valid 422, Qtag 424 (e.g., identifies the requested data when received from the arbiter), Q 426 (e.g., includes the requested data), ready 428, request 430 (e.g., a request signal from the agent to the arbiter that the agent would like to communicate with the arbiter), chip enable 432 (e.g., a chip enable signal to indicate either a read or a write is being performed), address 434 (e.g., memory location where the data is to be stored or read from), data 436 (e.g., data that is to be written or read), byte enabled 438 (e.g., byte enabled allows certain bytes of the data to be written or read), tag 440 (e.g., tag to identify data), and write 442 (e.g., used in combination with chip enable 432 to indicate a write is being performed).

Signals that are being transmitted to the arbiter are address 434, data 436, and byte enabled 438. When write 442 is set to true, then data can be written. When write 442 is set to false, then data cannot be written. A similar process is carried out when data is to be read from the memory. When receiving data, Q 426 includes the data, and valid 422 is set to high in order to store the data in the FIFO. It should be appreciated that read agent sequential unit 400 could be a read agent random unit in order to read data from random locations in the memory.

Figure 5:
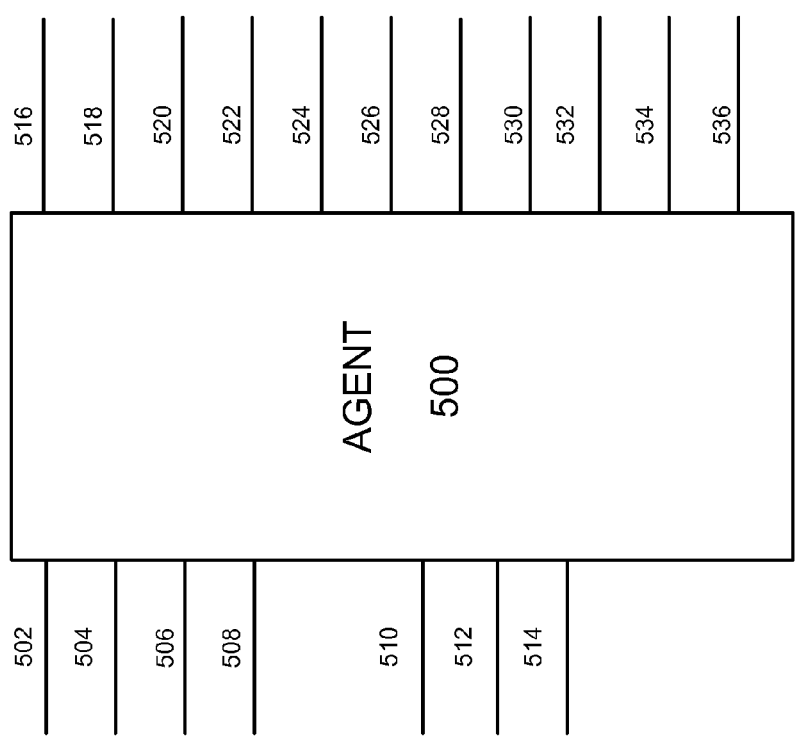
FIG. 5 illustrates a write agent sequential unit, in accordance with an embodiment of the present invention.

FIG. 5 illustrates a write agent sequential unit 500, in accordance with an embodiment of the present invention. The interface between write agent sequential unit 500 and the arbiter includes the following signal paths: valid 516, Qtag 518, Q 520, ready 522, request 524, chip enable 526, address 528, data 530, byte enabled 532, tag 534, and write 536. The interface between write agent sequential unit 500 and, for example, rectification module 102 includes FIFO data 502, FIFO write enabled 504, FIFO full 506, FIFO almost full 508, starting address 510, memory go 512, and memory done 514. FIFO write enabled 504 can be set to true or false. FIFO almost full 508 is utilized to inform the module that the FIFO is almost full, and FIFO full 506 is utilized to inform the module that FIFO is full.

In order to write data into write agent sequential unit 500, rectification module 102, for example, transmits a starting address of the memory to store the data utilizing starting address 510 and sets memory go 512 to true. This enables data to be written into a queue utilizing FIFO data 502. If the arbiter is busy and the FIFO is almost full, then write agent sequential unit 500 can transmit a signal via FIFO almost full 508 to indicate that the FIFO is almost full. If the arbiter is busy and/or the FIFO is full, then write agent sequential unit 500 can transmit a signal via FIFO full 506 to indicate that the FIFO is full. Once rectification module 102 is finished writing data to write agent sequential unit 500, memory done 514 is set to true and memory go 512 is set to false. It should be appreciated that write agent sequential unit 500 can be a write agent random unit in order to write data to random locations in the memory.

Figure 6:
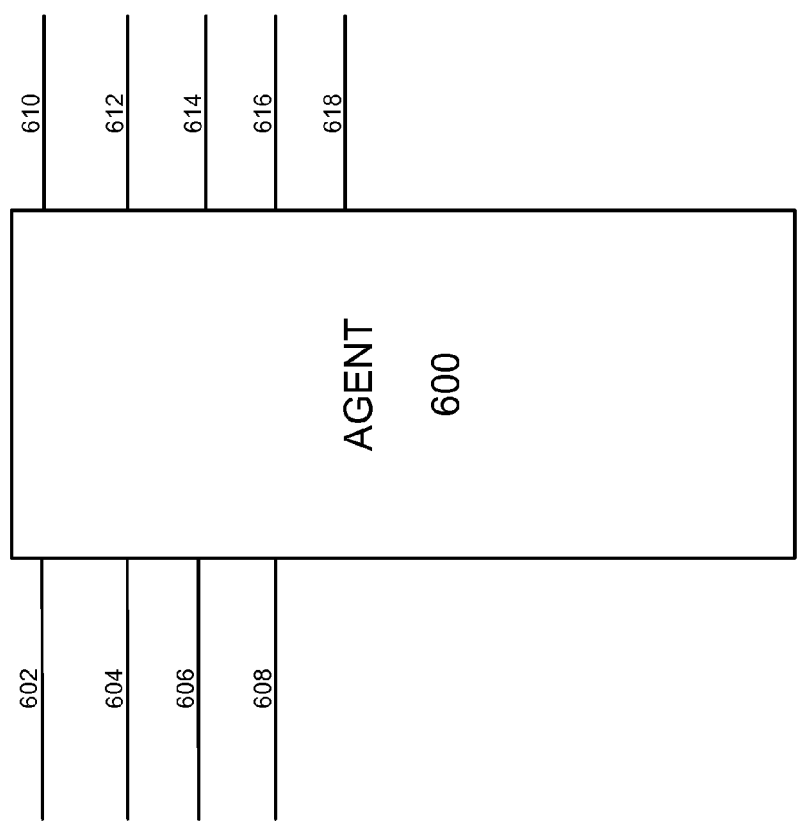
FIG. 6 illustrates a write agent pass-through unit, in accordance with an embodiment of the present invention.

FIG. 6 illustrates a write agent pass-through unit 600, in accordance with an embodiment of the present invention. In this embodiment, write agent pass-through unit 600 can interface with a module and another module or a module and a read agent pass-through unit.

The following data signal paths allow communication between write agent pass-through unit 600 and a module: FIFO data in 602, FIFO write enabled 604, FIFO full 606, and FIFO almost full 608. The following data signal paths allow communication between write agent pass-through unit 600 and a read agent pass-through unit: FIFO data out 610, FIFO read enabled 612, FIFO empty 614. FIFO almost empty 616, and FIFO valid 618.

Write agent pass-through unit 600 is configured to receive data from a module and pass the data to another read agent pass-through unit. For instance, when FIFO write enabled 604 is set to true, data can be transmitted from a module to write agent pass-through unit 600 via FIFO data in 602. When FIFO is full, FIFO full 606 is set to true in order to notify the module that the FIFO is full and data cannot be received by write agent pass-through unit 600 at this time. When FIFO is not full, FIFO full 606 is set to false in order to notify the module that data can be received by write agent pass-through unit 600. While data is written into the FIFO in write agent pass-through unit 600, data can be transmitted to the read agent pass-through unit via FIFO data out 610.

FIG. 7 illustrates a read agent pass-through unit 700, in accordance with an embodiment of the present invention. In this embodiment, read agent pass-through unit 700 interfaces with a write agent pass-through unit and a module. The following signal paths are utilized by read agent pass-through unit 700: FIFO data 702, FIFO read enabled 704. FIFO empty 706, FIFO almost empty 708, and FIFO valid 710. When FIFO valid 710 is set to true and FIFO read enabled 704 is set to true, the module can read and/or receive data from read agent pass-through unit 700 via FIFO data 702. In other words, read agent pass-through unit 700 is configured to received data from a write agent pass-through unit and pass the data to another module.

FIG. 8 illustrates a method 800 for receiving and transmitting data from a module utilizing agents. At 802, a multiplexor assigns data paths between at least one agent of each module and a corresponding arbiter of each memory bank. At 804, the at least one agent of each module queues a plurality of data requests from the module and transmits each data request to a corresponding arbiter. At 806, the at least one agent queues a plurality of data responses from the corresponding arbiter and transmits each data response to the module. In other words, based on the assigned data path, the at least one agent of the module reads data from the corresponding arbiter of the memory hank. At 808, the at least one agent of the module writes modified data to the corresponding arbiter of the memory hank based on the assigned data path. At 810, at least one pass-through write agent of the module writes the modified data to at least one pass-through read agent of another module. This allows the at least one pass-through read agent of the other module to read the modified data from the at least one pass-through write agent of the module. As a result, the method described in this embodiment allows the module to read and write data to memory, as well as to another module without reducing the throughput.

The method steps performed in FIG. 2, FIG. 3, and FIG. 8 may be performed by a computer program product, encoding instructions for the nonlinear adaptive processor to perform at least the method described in FIG. 2, FIG. 3, and FIG. 8, in accordance with an embodiment of the present invention. The computer program product may be embodied on a computer readable medium. A computer readable medium may be, but is not limited to, a hard disk drive, a flash device, a random access memory, a tape, or any other such medium used to store data. The computer program product may include encoded instructions for controlling the nonlinear adaptive processor to implement the method described in FIG. 2, FIG. 3, and FIG. 8, which may also be stored on the computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an application specific integrated circuit ("ASIC").

Embodiments described herein relate to an FPGA architecture with custom interfaces to transmit data to and from each module. Each module is configured with direct access to memory or another module to allow interleaving access to individual memory banks between a plurality of modules. The architecture allows arbitration to on-board DDR and/or SSRAM memory, allows up to 10-30 independent agents to access the memory (although different numbers of agents may be used in some embodiments, and this disclosure does not limit the number of agents that are used), and a method of exchanging data directly between modules without reducing the throughput of memory access. This architecture also supports low latency reads and writes and offers high throughput.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An FPGA architecture, comprising:
   a rectification module configured to receive image data from memory and rectify the image data;
   a filter module configured to receive the rectified image data and filter unwanted data from the rectified image data to generate filtered image data wherein the rectification module and filter module are operatively connected by two pass-through agents associated with the rectification module and filter module respectively;
   a disparity module configured to receive the filtered image data and generate a result in order to determine a distance between an object and a vehicle, wherein the filter module and disparity module are operatively connected by two pass-through agents associated with the filter module and disparity module respectively; and,
   a plurality of arbiters, each arbiter interfacing with the memory, wherein each arbiter is configured to receive a request for data from one or more read agents associated with the rectification module, filter module, or disparity module, and wherein a write agent associated with the disparity module is configured to transmit the result to the memory.

2. The FPGA architecture of claim 1, wherein the image data comprises right pixels of an image, right rectification table entries, left pixels of the image, and left rectification table entries, and
   wherein the rectification module is further configured to compare the right pixels of the image with the right rectification table entries to generate right rectified pixels of the image and compare the left pixels of the image with the left rectification table entries to generate left rectified pixels of the image.

3. The FPGA architecture of claim 2, wherein the rectified image data comprises right rectified pixels and left rectified pixels of an image, and
   wherein the filter module is further configured to compare the right rectified pixels with the left rectified pixels of the image to remove unwanted data and generate right filtered pixels and left filtered pixels.

4. The FPGA architecture of claim 1, wherein the filtered image data comprises right filtered pixels and left filtered pixels of the image, and
   wherein the disparity module is further configured to compare the right filtered pixels with the left filtered pixels to generate the result.

5. The FPGA architecture of claim 1, further comprising:
   a Harris module configured to receive a first image and a second image and detect features and a location of the features in the first and second image,
   wherein the Harris module is further configured to transmit a result to memory based on the detected features.

6. The FPGA architecture of claim 5, further comprising:
   a vision odometry sum of absolute differences module configured to receive the first and second image, a list of the features for the first image, and a list of the features for the second image,
   wherein the vision odometry sum of absolute differences module is further configured to compare the list of the features between the first and second images to determine a distance traveled by the vehicle, and
   wherein the vision odometry sum of absolute differences module is further configured to generate a result based on the comparison of the list of the features between the first and second images.

7. The FPGA architecture of claim 1,
   wherein each arbiter is configured to
      receive a request for data from an agent associated with the rectification module, the filter module, the disparity module, a Harris module, or a vision odometry sum of absolute differences module, and
      transmit the requested data to the agent associated with the rectification module, the filter module, the disparity module, a Harris module, or a vision odometry sum of absolute differences module.

* * * * *